(12) United States Patent
Brockmeyer et al.

(10) Patent No.: US 6,591,284 B1
(45) Date of Patent: Jul. 8, 2003

(54) METHOD FOR PERFORMING A FAST TRANSFORM

(75) Inventors: Erik Brockmeyer, Leuven (BE); Cedric Ghez, Verrieres-le-Buisson (FR); Francky Catthoor, Temse (BE); Johan D'Eer, Kruibeke (BE)

(73) Assignee: Interuniversitair Microelektronica Centrum, Leuven (BE)

( * ) Notice: Subject to any disclaimer, the term of this patent is extended or adjusted under 35 U.S.C. 154(b) by 528 days.

(21) Appl. No.: 09/613,181

(22) Filed: Jul. 10, 2000

Related U.S. Application Data
(60) Provisional application No. 60/143,073, filed on Jul. 9, 1999.

(51) Int. Cl.⁷ ............................................... G06F 17/14
(52) U.S. Cl. ..................................... 708/400; 708/404
(58) Field of Search .......................... 708/400, 402, 708/403, 404

(56) References Cited

PUBLICATIONS

DeGreef, "Storage Size Reduction for Multimedia Applications", Doctoral Dissertation, ESAT/EE Dept., K.U. Leuven Belgium, Jan. 1998.

DeGreef, et al., "Reducing Storage Size for Static Control Programs Mapped onto Parallel Architectures" Presented at Dagstuhl on Loop Parallelisation, Schloss Dagstuhl, Germany, Apr. 1996.

F. Catthoor, et al., "Custom Memory Management Methodology—Exploration of Memory Organisation for Embedded Multimedia System Design", ISBN 0–7923–8288–9, Kluwer Acad., Boston 1998.

E. De Greef, et al., "Array Placement for Storage Size Reduction in Embedded Multimedia Systems", Proc. Intnl. Conf. On Applic.—Spec. Array Processors, Zurich Switzerland, pp. 66–75, Jul. 1997.

E. De Greef, et al., "Memory Size Reduction through Storage Order Optimization for Embedded Parallel Multimedia Applications", special issue on "Parallel Processing and Multi–media" (ed. A. Krikelis), in Parallel Computing Elsevier, vol. 23, No. 12, Dec. 1997.

F. Vermeulen, et al., "Formalized Three–Layer System–Level Reuse Model and Methodology for Embedded Data–Dominated Applications", IEEE Transactions on Very Large Scale Integration (VLSI) Systems, vol. 8, No. 2 Apr. 2000.

*Primary Examiner*—David H. Malzahn
(74) *Attorney, Agent, or Firm*—Knobbe Martens Olson & Bear LLP

(57) ABSTRACT

The power consumption, memory allocation, and CPU time used in a signal processor executing a fast transform can be optimized by using a particular method of scheduling the calculations. The transform typically is used to transform a first m-dimensional indexed array into a second m-dimensional indexed array. The elements of the first m-dimensional array are grouped according to the index difference between the elements of the particular butterfly code of that stage. A second grouping of elements is composed of butterfly code elements having non-maximal index differences. The second group advantageously includes elements also assigned to the first group. The butterfly codes of the groups are arranged sequentially and are executed in the sequential schedule. In a second embodiment, elements are grouped according to a group specific threshold value. Memory is allocated to the groups according to the size of the group such that the access to memory is minimized during execution.

14 Claims, 8 Drawing Sheets

METHOD FOR PERFORMING A FAST TRANSFORM

RELATED APPLICATIONS

This patent application claims the benefit of, and incorporates in its entirety, U.S. Provisional Application No. 60/143,073, filed Jul. 9, 1999.

BACKGROUND OF THE INVENTION

1. Field of the Invention

This invention relates to digital signal processing. More particularly, this invention relates to memory, CPU, and power efficient performing of fast transforms.

2. Description of the Related Art

In literature many fast transforms (fast Fourier transform, fast cosine transformation, etc.) are known. As an example the fast Fourier transform is discussed below but the invention is not limited thereto.

Traditionally, as shown in FIG. 7, FFT stages are calculated sequentially on a programmable processor or in a time multiplexed hardware solution, usually followed by a sequential iteration over each block and the butterflies involved. Three nested loops are considered: stage—block—butterfly. The access graph shown in FIG. 8 shows which addresses are used for calculation at each moment. The end points of each line represent which elements are used; the length of a line determines the current stage. FIG. 7 is the traditional representation of an FFT. FIG. 8 shows the access sequence in time. E.g. the content of addresses 0 and 16 are used first, followed by addresses 1 and 17, etc. In the second stage, address 0 and 8 are used, 1 and 9, etc. The presented scheduling of the butterflies is not optimal when power consumption of the hardware device on which the transform is executed is important.

SUMMARY OF THE INVENTION

The invention presents memory access orderings, also denoted schedules, for fast transforms which are optimal with respect to power consumption and bus loading of the hardware device on which said transforms are executed.

The invention presents a method for minimizing memory space and power consumption in a signal processor when transforming a first m-dimensional indexed array with N elements into a second m-dimensional indexed array with M elements, said second array being a transform of said first array, said method comprising the steps of executing a plurality of butterfly codes, also denoted calculation method steps, each butterfly code being characterized by the elements of the indexed arrays accessed by said butterfly code, said method is characterized in that at least part of said butterfly codes are assigned to be part of at least one group of butterfly codes such that butterfly codes within one group are executed sequentially, meaning substantially close after each other in time, and said grouping of butterfly codes enables the use of storage spaces being substantially smaller than then storage space needed to store an array with N elements. The storage spaces used are either registers or a distributed memory configuration or a combination thereof. Note that M is often equal to N.

In a first aspect of the invention data locality improvement schedules are presented. In a first embodiment a full data locality improvement schedule is disclosed while in a second embodiment a partial data locality improvement schedule is shown.

The full data locality improvement schedule can be described as a method for transforming a first m-dimensional array into a second m-dimensional array, wherein said second array being a transform of said first array. Said transform can be a Fourier transform, a cosine transform, a Karhunen-Loève transform, a Hartly transform but is not limited thereto. Said method comprising the steps of executing a plurality of codes, also denoted butterfly codes, each code being characterized by its array variables or array elements it accesses. One can state that said arrays are indexed, meaning that each element of said arrays can be referred to by its index number. Note that with code or butterfly code is meant a calculation method which reads elements of an array and produces new elements. More in particular is meant a method reading elements and producing elements via operations such as complex additions, subtractions, multiplications and/or divisions. The multiplication factor is a parameter, which can vary from execution to execution of said codes while the operations are the same within said codes. Said execution is characterized in that said codes are scheduled by grouping in pairs or sets of codes with a maximal distance between the array variables accessed by said codes. Said pairs are placed in a predetermined ordering. In a particular example said predetermined ordering is address bit-reversed. Note that with distance is meant the index difference of the elements of the array under consideration. Distance can also be denoted window. With maximal is meant having the largest index difference when considering all codes needed to describe the transformation under consideration. For each pair of said ordened codes codes which access at least one array variable being accessed also by one of the code of said pair are determined. Note that not necessarily all such codes are selected. Thus part of the codes which have a common access with one of the code of said pair are selected. The selected codes can be denoted as codes being assigned to such a pair. The selected codes are ordened in a binary tree with as top node one of said pair of codes according to their related maximal distance wherein higher distance of such code implies closer placement to the top node of said tree. For each pair of codes a binary tree can be constructed. The execution order of said ordered codes is determined by traversing said binary tree in a depth-first manner. Note that this is done for each pair. The improved data locality obtained by the above described scheduling is exploited because during said execution of said scheduled codes data is shared between at least part of said pairs of codes subsequently scheduled after one another. This data sharing is done via small memories, often denoted registers, register files, being capable of storing a few elements, possible a single element. Said small memories, also denoted foreground memory, are local to the datapath of the hardware device executing said application. Note that with subsequently scheduled is meant scheduled soon after each other in time. Some intermediate operations are possible depending on the amount of elements that said data sharing memories can store. During said execution of said scheduled butterfly codes at least part of the accesses of elements accessed by said scheduled butterfly codes are accesses to a storage space being capable of storing a few elements.

A first characteristic of the best mode realisation of the full data locality improvement ordering is an address bit-reversed selecting of the butterflies with largest index difference, also denoted top butterflies, is done. Suppose that the butterfly selected is characterized by the address of the element it accesses with the lowest address number. Suppose one write down the sequence 0,1,2, . . . in binary format with $\log_2(N)-1$ number of bits with N the size of the transform, thus 0000, 0001, 0010, . . . for a 32 Fourier transform as an example. This binary sequence is now transformed into another binary sequence by reversing the bit ordering, thus one obtains 0000, 1000, 0100, . . . or in normal format 0, 8, 4, . . . This sequence gives the lowest address number of the butterfly being selected as can be observed in FIG. 4. A second characteristic of the best mode realisation of the full data locality improvement ordering is the tree-depth, meaning the number of levels in said binary trees, each level being characterized by the index difference which is the same for the butterflies represented by the nodes of a single level. The tree-depth is given by the $\log_2(N)-[\log_2(N/2-x)]$, wherein x means the lowest address number of the butterfly defining the top node of the tree, hence the wording top butterflies, and [ ] means rounding the number in between brackets up to the following larger integer. An example is given in the table below showing in the actual location of the top butterflies, their characterizing address (lowest address) and the depth of their related tree.

| 0 | 0 | 1 |
|---|---|---|
| 1 | 8 | 2 |
| 4 | 4 | 1 |
| 5 | 12 | 3 |
| 12 | 2 | 1 |
| 13 | 10 | 2 |
| 16 | 6 | 1 |
| 17 | 14 | 4 |
| 32 | 1 | 1 |
| 33 | 9 | 2 |
| 36 | 5 | 1 |
| 37 | 13 | 3 |
| 44 | 3 | 1 |
| 45 | 11 | 2 |
| 48 | 7 | 1 |
| 49 | 14 | 5 |

A partial data locality improvement schedule is described as a method for transforming a first m-dimensional array into a second m-dimensional array, said second array being a fast transform of said first array, said method comprising the steps of executing a plurality of butterfly codes, each butterfly code being characterized by the elements of the array accessed by said butterfly code, said execution is characterized in that said butterfly codes are scheduled by performing a step 1 and a repetition of step 2 . In step 1 from said butterfly codes half of these butterfly codes with a maximal index difference between the elements of the array accessed by said codes are selected and executed in a predetermined ordering, e.g. bit-reversed ordering. The other half of these butterfly codes are denoted non-executed butterfly codes. In step 2 for half of these non-executed butterfly codes with a maximal index difference between the elements of the array accessed by said codes one performs an operation but for each of these non-executed butterfly codes separately. For such a non-executed butterfly code other butterfly codes are selected with a minimal index difference of half of said maximal index difference and which access at least one element of an array being accessed also by the non-executed butterfly code under consideration. Said non-executed butterfly code under consideration and said selected codes are then executed. This operation is thus performed for half of the non-executed butterfly codes. For the remaining half of the non-executed butterfly codes also step 2 is performed but the minimal index difference decreases by factor of 2 for each repetition of step 2. In a further embodiment a binary tree scheduling approach is used for said selected codes. Naturally again data sharing via registers or foreground memory can now be used due to the data locality improvement.

The first embodiment using a full data locality improvement can be described as follows:

A method for transforming a first m-dimensional array into a second m-dimensional array, said second array being the Fourier transform of said first array, said method comprising the steps of executing a plurality of butterfly codes, each butterfly code being characterized by the elements of the array accessed by said butterfly code, said execution is characterized in that said butterfly codes are scheduled as follows:

From said butterfly codes these butterfly codes with a maximal index difference between the elements of the array accessed by said codes are selected and grouped in pairs and placed in a predetermined ordering;

For each pair of said selected and ordered butterfly codes, butterfly codes which access at least one element of said arrays being accessed also by one of the butterfly codes of a pair are determined and assigned to said pair.

For each pair of said selected and ordened butterfly codes, the assigned butterfly codes are ordened in a binary tree with as top node one butterfly code of said pair according to the index difference between the elements of the array accessed by said butterfly code wherein a higher index difference of such butterfly code implies closer placement to the top node of said tree and determining the execution order of said assigned butterfly codes by traversing said binary tree in a depth-first manner.

The method described above wherein during said execution of said scheduled butterfly codes at least part of the accesses of elements accessed by said scheduled butterfly codes are accesses to storage spaces being capable of storing a single element or a few elements.

The second embodiment partially using said data locality improvement can be described as follows:

A method for transforming a first m-dimensional array into a second m-dimensional array, said second array being a fast transform of said first array, said method comprising the steps of executing a plurality of butterfly codes, each butterfly code being characterized by the elements of the array accessed by said butterfly code, said execution is characterized in that said butterfly codes are scheduled as follows:

Step 1 From said butterfly codes half of these butterfly codes with a maximal index difference between the elements of the array accessed by said butterfly codes are selected and executed in a predetermined ordering;

Step 2 For each of half of the non-executed butterfly codes with a maximal index difference between the elements of the array accessed by said codes, butterfly codes are selected with a minimal index difference of half of said maximal index difference and which access at least one element of an array being accessed also by the non-executed butterfly code under consideration, said non-executed butterfly code under consideration and said selected codes are executed; and Step 2 is repeated for half of the non-executed codes but the minimal index difference decreases by factor of 2 for each repetition of step 2.

The method described above wherein selected codes are ordered in a binary tree with as top node the last of the non-executed code, said ordering in said binary tree is according to the index difference of said selected codes wherein higher index difference of such code implies closer placement to the top node of said tree and the execution order of said selected codes is determined by traversing said binary tree in a depth-first manner.

The method described above wherein during said execution of said scheduled butterfly codes at least part of the accesses of elements accessed by said scheduled butterfly codes are accesses to storage spaces being capable of storing a single or a few elements.

In a second aspect of the invention improved in-place mapping schedules for performing a fast transform are presented. The invention can be described as a method for transforming a first m-dimensional array into a second m-dimensional array, said second array being a fast transform of said first array, said method comprising the steps of executing a plurality of codes, also denoted butterfly codes or calculation method steps, each code being characterized by its array variables or elements it accesses. Said execution is characterized in that said codes are scheduled such that codes accessing nearby array variables are grouped, codes within one group are executed sequentially and said execution of codes exploit a memory being smaller than said array sizes. With nearby array variables or elements is meant elements of said arrays with an index difference between said elements smaller than a threshold value being at most (N/p) with N the amount of elements in said arrays and p an integer being larger than 1. With a memory being smaller than said array sizes is meant a memory with a storage space for less than N elements. Note that both a sequential execution, wherein each group is executed after each other, or a parallel execution, wherein groups are executed substantially simultaneously, is possible. Also combinations of sequential and parallel are possible. One can further specify for the sequential set-up that after finishing execution of a first group of code data within said memory is transferred before execution of a second group of code is started. The minimal memory size is determined by the maximal distance between the array variables accessed while executing a group of codes. Said maximal distance is characterized by the index difference between said array variables or elements. The data transfer is between said memory and another memory having a size at least larger than said memory. Said second aspect of the invention is not limited to grouping of said butterfly codes in one group of a single size. One can assign each individual butterfly codes to a plurality of groups with different sizes With size of a group is meant the maximal index difference of elements being accessed by butterfly codes within a group. Said size is determined by the so-called group-specific threshold value. With each group a group-specific memory with a minimal size being determined by said threshold value is associated. Indeed, execution of codes within such group is done by accessing said group-specific memory. One can state that a group of codes are executed sequentially before executing another group of codes and said groups of code, which while executing have the same maximal distance between the array variables accessed, can exploit the same memory, meaning the group-specific memory. Thus at least part of said butterfly codes are assigned to be part of at least one group of butterfly codes such that butterfly codes within a group are butterfly codes accessing elements of said arrays with an index difference between said elements smaller than a group-specific threshold value being at most N/p. Then butterfly codes within one group are executed sequentially before executing butterfly codes of another group and said execution of said groups of butterfly codes exploit a group-specific memory with a minimal storage space being determined by said group-specific threshold value. The data transfer in between execution of groups of codes is then between memories of different sizes, more in particular the memory with its group-specific size and a memory with a larger size, possibly another group-specific memory or the main memory. The memory configuration is denoted a distributed memory configuration and can be but is not limited to be a hierarchical memory architecture. Note that said in-place execution is characterized in that at least part of said codes are scheduled such that codes accessing nearby array variables are executed nearby in time.

An embodiment of said in-place mapping approach can be formalized as follows:

A method for transforming a first m-dimensional indexed array with N elements into a second m-dimensional indexed array with N elements, said second array being a fast transform of said first array, said method comprising the steps of executing a plurality of butterfly codes, each butterfly code being characterized by the elements of the indexed arrays accessed by said butterfly code, said execution is characterized in that at least part of said butterfly codes are scheduled such that butterfly codes accessing elements of said arrays with an index difference between said elements smaller than a threshold value being at most N/p with p an integer being larger than 1 are assigned to a group, butterfly codes within one group are executed sequentially before executing butterfly codes of another group and said execution of said groups of butterfly codes accesses only a first memory with a storage space for less than N elements.

The method described above, wherein after finishing execution of a first group of butterfly codes a data transfer between said first memory and a second memory being larger than said first memory is performed before execution of a second group of butterfly codes is started.

DETAILED DESCRIPTION OF THE PREFERRED EMBODIMENT

Figure 1:
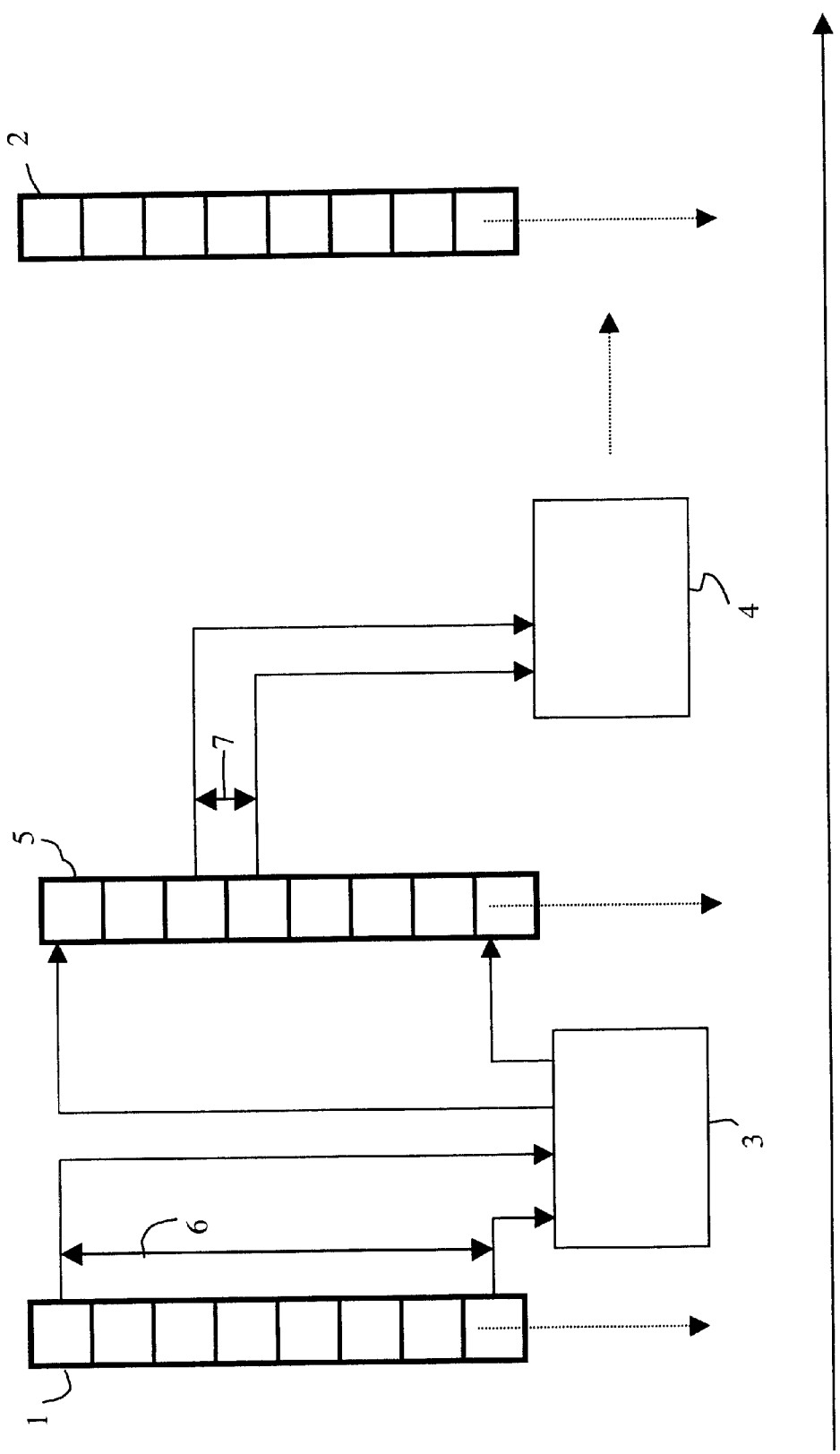
FIG. 1 shows a principal scheme wherein a first (1-dimensional) array (1) is transformed into a second (1-dimensional) array (2) via intermediate arrays (5) by executing of code chunks (3) (4), accessing a plurality of elements of said arrays (here 2).

The invention deals with applications, which can be described by a plurality of code chunks which are substantially equivalent to each other, meaning performing the same operations but with other parameters. The application is performed by executing said code chunks in a certain order.

The code chunks are thus scheduled. The applications dealt with in the invention are such that various schedules of said code chunks are acceptable for obtaining the functionality described by said application but no all schedules are acceptable due to data dependencies. Indeed said code chunks read data, modify said data and write said data. In general one can state that code hunks access data. The functionality of said application is only realized when the data dependencies inherent to said functionality are respected by the code chunks schedule.

The invention presents schedules for such applications and thus exploits the remaining degrees of freedom in said scheduling while respecting the data dependencies. The presented schedules are such that when said application is executed on hardware, then the power consumed by said hardware while executing said application is minimized. Said hardware can be a general purpose computer with a certain memory structure or a dedicated hardware device, specially designed for said application or a combination thereof.

The power consumption optimal schedules are selected to have a good data locality, meaning that data produced by a code chunk is consumed as soon as possible by another code chunk. Alternatively said power consumption optimal schedules are selected such that distributed memory configurations in said hardware can be optimally exploited. With distributed memory configuration is meant a plurality of memories, ordened from small to large memories. With optimally exploitation of said configuration is meant having more data accesses to smaller memories than to larger memories. Power consumption optimalisation by combining both data locality improvement and enhanced the use of a distributed memory configuration is of course possible. In addition to the data transfer related power, also the system bus load is reduced. This results in an increase of pure CPU speed because less cache misses and stalls can be expected.

The invention presents schedules for said type of applications which are more power optimal by using thus either data locality or enhanced use of distributed memory configurations or combination thereof. The invention also specifies how data locality is exploited by indicating how data sharing is performed on said hardware. The invention also specifies how distributed memory configurations are used.

In the applications dealt with by the invention said code chunks are characterized by the elements of the indexed array accessed by said code chunk. Although in the further description the invention is described for code chunks accessing 2 elements, the invention is equally applicable to code chunks accessing more than 2 elements also. Although in the further description reference is made to 1-dimensional indexed arrays the invention is equally applicable to multi-dimensional indexed arrays also. The invention deals with applications which perform linear transformations of arrays but which are constructed such that their complexity increases in a logarithmic way with the dimensionality of the arrays treated by the transform. This characteristic is often denoted by stating that a fast transform is meant. A nonlimiting list of examples of such transformations is the fast Fourier transform, the fast cosine transform, fast Hartly transform and fast Karhunen-Loève transform.

The invention in particular relates to a Fourier transform application (FIG. 1) wherein a first 1-dimensional data array (1) is transformed into a second 1-dimensional data array (2), being the Fourier transform of said first data array but the invention also applies to similar type of transforms. The Fourier transform application can according to the fast Fourier transform approach be represented as a plurality of code chunks, further denoted butterfly codes (3)(4). Said butterfly codes can be scheduled in various ways but certain data dependencies must be respected in order to guarantee that the actual result of executing the code is a Fourier transform.

A butterfly code reads two elements of said first array and produces two new elements that can overwrite the two elements read. Said butterfly codes are substantially similar codes because said codes all read two elements, multiplies one of said read elements with a parameter, adds to said multiplied element the other read element resulting in a first element to write and subtracts said multiplied element from said other read element resulting in a second element. Note that said addition, subtraction and multiplication operation can be operations on complex numbers, hence complex operations. The parameter used in said butterfly codes can differ from code to code. The elements accessed can also differ from butterfly code to butterfly code. The pair-wise accessing of said codes can be represented as wings, hence the name butterfly code. Each of said butterfly code can uniquely be characterized by the two elements it reads or accesses. For instance, suppose that said 1-dimensional data arrays have a length of 32, meaning that these arrays contain 32 elements. Suppose said 32 elements have an index between 0 and 31. One butterfly code would then be characterized as one accessing element 0 and 7 and another butterfly code would then be characterized as the one accessing elements 2 and 3. The index difference (6)(7) between the elements access by said butterfly codes is also a characteristic of said butterfly codes. The butterfly code accessing elements 0 and 7 has an index difference of 7 while butterfly code accessing elements 2 and 3 has an index difference of 1. Note that although a first and a second array are identified respectively as the initial data array and the resulting data array, it must be clear that during execution of said butterfly codes intermediata temporal arrays can be identified, for instance the array obtained after executing the first scheduled butterfly code is different from said first array in the two elements accessed by said butterfly code. Although a plurality of arrays can be identified the butterflies remain characterized by the indexes of the accessed elements as described before. With array variables can be meant both said first, said second and identified intermediate temporal arrays. Note also that the reference to the element index relates to the functional location of the data of said element in an array and not directly to a location of said data of said element in memory.

The Fourier transform application can be described as a method for transforming a first 1-dimensional array into a second 1-dimensional array, said second array being the Fourier transform of said first array, said method comprising the steps of executing a plurality of butterfly codes, each code being characterized by the two elements of said array variables it accesses. The invention described a schedule for executing said butterfly codes. A schedule can be represented in a diagram wherein for each butterfly code a single vertical line is drawn at a certain time instance on a horizontal time axis. The endpoints of each line indicate which array elements are accessed. The diagram (FIG. 2, bottom) shows the actual schedule (which code is executed when) and the accessing order of said array elements (which elements are accessed when). Another representation of certain embodiments of the invention is the structure of the overall code of said application, more in particular the loop structure.

Figure 2:
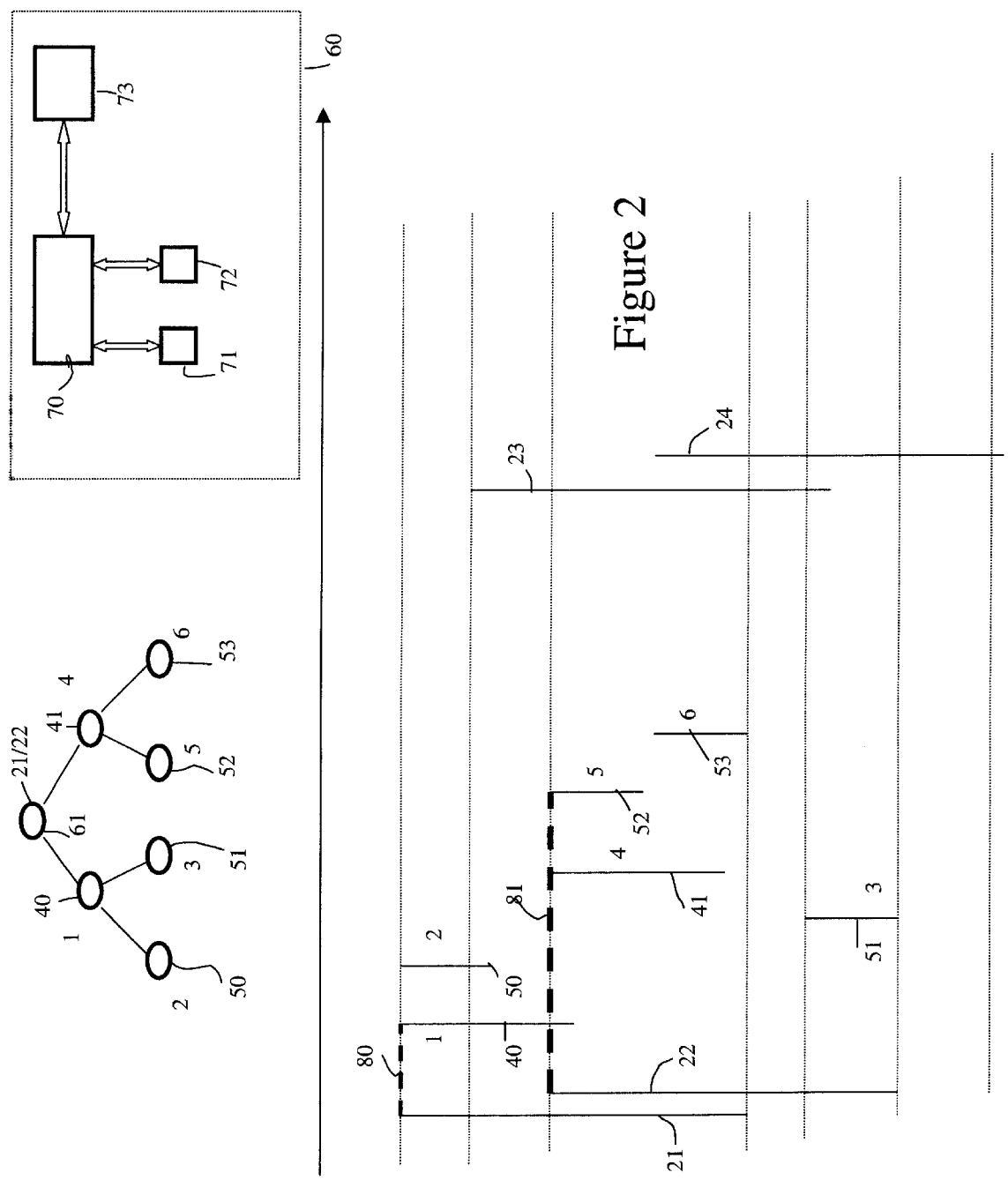
FIG. 2 shows a data locality improvement scheduling approach. The access graph shows, in vertical lines, the code chunks executed in time. The horizontal access is the time line. The ends of the vertical lines indicate the elements being accessed by said code chunks. The scheduling is performed via a tree representation.

In a first aspect of the invention a data locality optimal scheduling is described. From the plurality of butterfly codes one select these with a maximal index difference (21) (22) (23), (24), . . . and put them in a first set of maximal index difference butterfly codes. Within this first set one creates pairs of butterfly codes (e.g. pair (21) (22) and pair (23) (24)) and then order said pairs of butterfly codes in a predetermined order (e.g a bit reversed ordering). Then for each pair butterfly codes from said plurality of butterfly codes, except the butterfly codes in said first set are determined, which access at least one array element being accessed also by one of the code of said pair considered. For said pair (21) (22) the butterfly codes (40)(41) and (50) (51), (52) (53) are selected. Note that the horizontal dashed line indicate an access relation between butterfly codes. These determined butterfly codes are placed in a set, uniquely related to the pair considered. The butterfly codes within such a set are then ordened in a tree (60). The top node (61) of said tree represents either one of said codes of said pair. The butterfly codes within such a tree are first ordened according to their index difference. Codes with a high index difference are placed closer to the top node than ones with a lower index difference. One can state that said ordening is done according to their index difference, wherein higher index differences of a code implies closer placement to the top node of said tree. As for each index difference a number of codes being a power of 2 are found, said tree will be a binary tree, meaning that each node has two branches. The data locality optimal scheduling is then as follows: one selects a pair of codes from said first set according to their predetermined ordering. One executes the codes in said selected pair in a random order. Then one traverses the tree in a depth-first manner and executes the codes in said binary tree on a traversed node not being executed yet. The execution order of said in a tree ordened codes is thus determined by traversing said binary tree in a depth-first manner. This is illustrated in FIG. 2 for butterfly codes related to the pair (21)(22). The numbers indicate the execution order and the relation with the traversing of the binary tree. Note that not necessary maximal index difference codes are used as starting point for pair-wise grouping. The approach described above can start with codes with a smaller index difference and all codes with an index difference being lower than the ones to start with.

Figure 4:
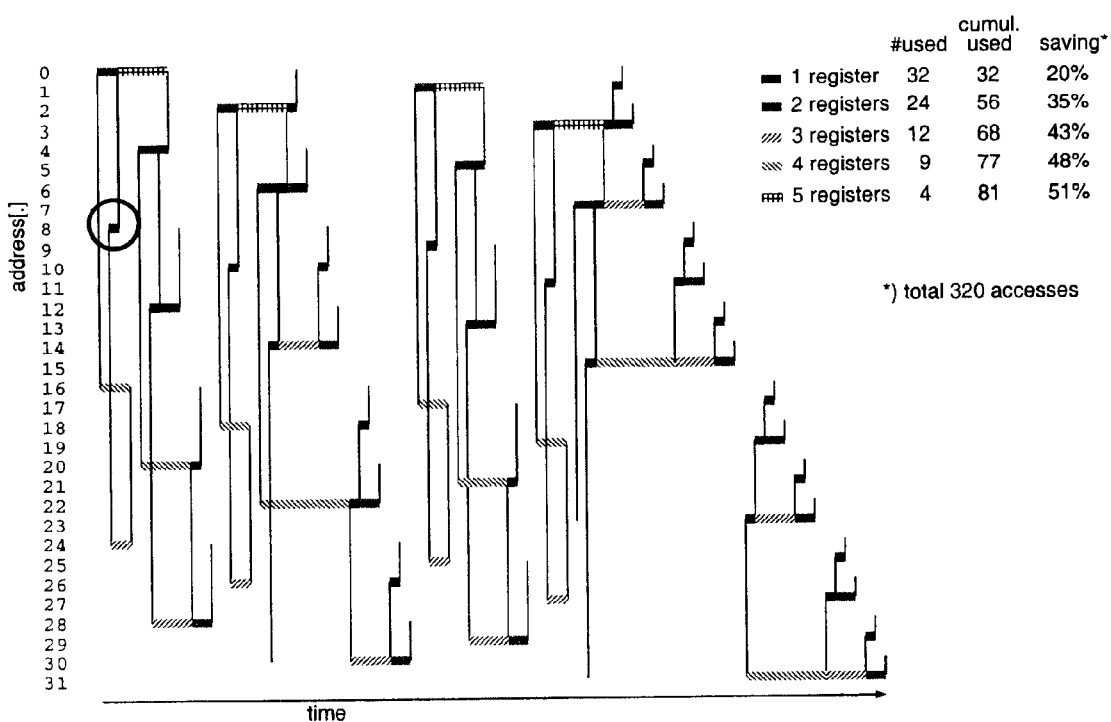
FIG. 4 shows a full data locality improved schedule.

The presented butterfly schedule has a good data locality and thus good data locality can be exploited now for having a more optimal power consumption when one wants to perform the Fourier transform on a hardware device (60). Indeed the data in said arrays are stored in a memory (73), also denoted the main memory, with enough storage place for storing the complete array. A traditional execution of the Fourier transform, thus not scheduled as described above, would result in accessing said memory each time when one reads or writes a data element of said array. A hardware device however also has some registers (71)(72), close to the arithmetic unit (70). Said hardware device can have a number of registers by construction or one can design a specialized hardware design for said Fourier transform application and select the number of registers. As only a limited number of registers are available and because the storage space of said registers is limited and can not contain the arrays being dealt with in the application completely, temporarily storage of array elements in said registers is only useful when good data locality is there, meaning that an element stored in such register by a first butterfly is consumed soon by a second butterfly. With soon is meant before said element is overwritten by yet another butterfly code. Depending on the number of registers the time between production of an element and consumption of said element can differ. Indeed the more registers the more time can elapse between production and consumption. The dashed bold line (80) illustrates a data sharing possibility in case of a single register between code (21) and (40) while (81) shows a data sharing possibility between (22) and (52) when a second register is available. The execution method described above is such that during said execution of said scheduled codes data is shared between at least part of said pairs of codes subsequently scheduled after one another. Said data sharing is done via registers. Note that the scheduling of said codes results in an access ordering also, meaning an ordering of when a certain element of an array is accessed in function of time. FIG. 4 shows a complete diagram of a data locality improved schedule with vertical line referring to code and horizontal lines referring to data sharing possibilities, depending on the amount of register available or made available during custom design.

Figure 3:
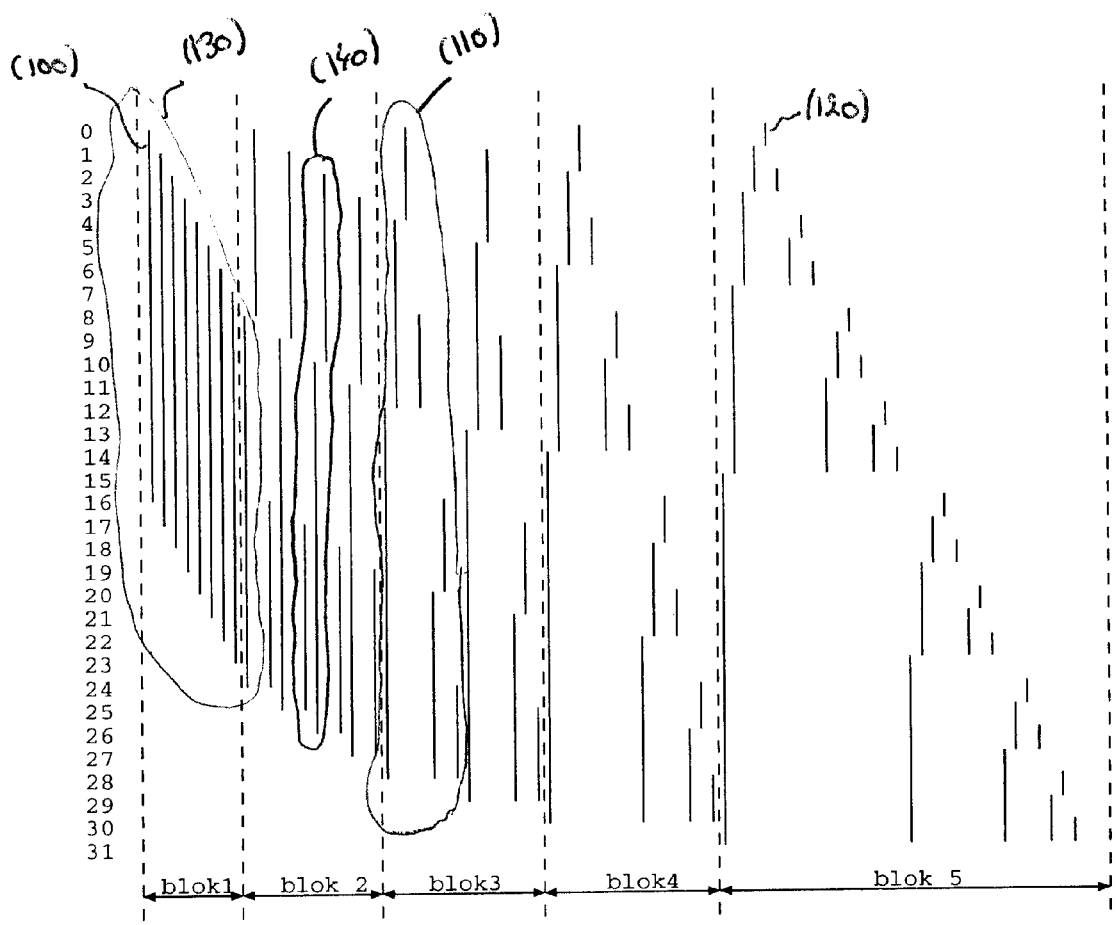
FIG. 3 shows a partial data locality improved schedule.

In the above discussed scheduling data locality improvement is used completely. Naturally it can be sufficient to have a partial data locality improvement. A scheduling having a partial data locality improvement, partial with reference to a traditional implementation is now presented. Said scheduling can be formalized as a three loop code wherein the deepest nested loop executes again butterfly code. The outer loop is denoted the block code loop, the second loop is denoted repetitive pattern code and the deepest nested loop is denoted the lob code loop. For each of said loops the number of repetitions of the code is given. Said number of repetitions of deeper nested loops is dependent on the number of executions of the code wherein said code is nested. The naming of the loops refers to a structure, which can be recognized within the scheduling diagram. FIG. 3 shows a partial data locality improving schedule wherein blocks (100), repetitive patterns (110) and lobs (120) are indicated. There is a change from one block to another when another pattern appears. A repetitive pattern is characterized as a pattern starting with a code having the highest index difference. A lob is just a butterfly code. Characterizing for said partial data locality improvement schedule is also its access ordering. The scheduling of the butterfly codes for this case is determined as follows. Half of the codes (130) with a highest index difference between the two elements in said array accessed by said codes are executed in a predetermined ordering. For half of the remaining codes with such a highest index difference one determines for each of said remaining codes separately codes with a index difference being half of the highest index difference and which access at least one array element also being accessed by the remaining code under consideration. Once these codes are determined, they are scheduled together with their related remaining code and executed. This approach generates in the example of FIG. 3 four repetitive patterns (140). After finishing the previous step still codes with such a highest index difference are not executed. For these the same procedure of determining codes per remaining code is repeated again for the half of these codes but the determined codes selected can have now an index difference being half or a fourth of said highest index difference as shown in repetitive pattern (110). For each repetition of said step the lowest considered index difference equals the highest index divided by 2 to the power the number of repetitions of said step. Also the determined codes are related to each other because a code with a lower index difference accesses an array element at least being accessed by a code having a higher index difference. Note that the data locality is improved thus data sharing via registers is possible. As an example one can share element 0 between the last code of the sequence (100) and the first of the sequence of repetitive patterns of type (140) if one register is available. When a second register is available in the hardware device, one can share values between codes which are separated by one other code execution, such as the last code of sequence (100) and the second code of the first repetitive pattern of type (140).

It is a second aspect of the invention a scheduling allowing power optimal use of distributed memory configurations are presented. Said distributed memory configurations are residing in the hardware device on which the optimal scheduled application is executed. Recall that the Fourier transform application accesses arrays. With distributed memory configuration is meant here a plurality of memories containing a least a temporarily memory with a size not being capable to store the complete array and another memory at least capable for storing said arrays. The latter memory can be denoted the main memory. The notion temporarily denotes that data stored within said memory can only temporarily resides there during execution of said application, thus transfers of data between such a temporarily memory and the main memory are needed. Taking advantage of smaller memories because they are less power consumptive requires an appropriate scheduling, often denoted an in-place scheduling or mapping. Said schedule must however respect the data dependencies of said application.

Figure 5:
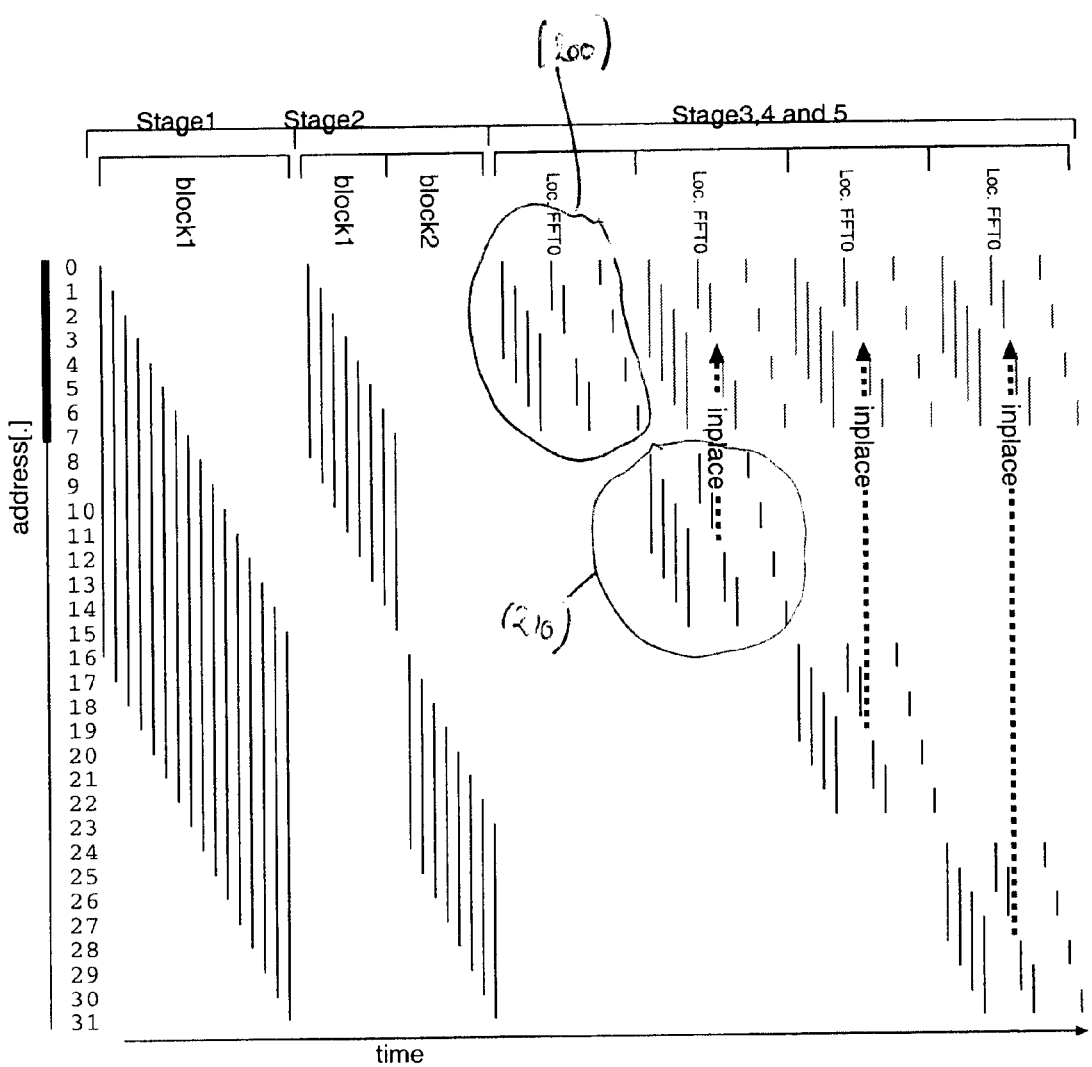
FIG. 5 shows an in-place mapped schedule.

In a first embodiment the use of a single temporarily memory is in the distributed memory configuration is presented. The application comprises of code chunks, each being characterized by the elements of the arrays they access. The application is executed by executing each of said code chunks according to a predetermined schedule. Optimal use of a distributed memory configuration can be obtained by grouping code chunks, which access nearby elements in said array variables. With nearby is meant having an index being within a certain range. For instance a code chunk addressing elements 0 and 7 and another code chunk addressing elements 1 and 2 are within a range of length 8. Consider an application wherein arrays of length 32 are used. In the invention one groups said code chunks of length less than the length of said arrays such that groups of code chunks accessing nearby elements are created. For instance code chunks addressing a subarray of length 8 are considered. Then one executes said code chunks groupwise. The execution of a group of code exploits a single temporarily memory having a size being smaller than the array sizes (in the example 32). One can state that after finishing execution of a first group of code one needs to transfer the data found in said temporarily memory to the main memory and transfers new data from said main memory to said temporarily memory before one starts executing a new group of code. Further the minimum size of the temporarily memory (in the example 8) is determined by the maximal difference in index of the elements being accessed by codes within a single group. FIG. 5 shows an in-place scheduling. For the first two stages a traditional scheduling is used. The remaining code chunks are scheduled. One recognizes a first group (200) which only accessed elements 0 to 7. A second group (210) accesses only elements 8 to 15. Note that arrow showing how the code is moved to element accesses with lower index numbers. This arrow indicates that while execution said second group of code one will use a memory of minimal size 8. That memory is also the memory used while execution said first group (200).

In a second embodiment the in-place scheduling approach is extended to a distributed memory configuration with a plurality of temporarily memories. Suppose one performs a first grouping wherein one groups codes accessing array elements having a range 0–15 in a first group and codes accessing array elements having a range 16–31 in a second group. With said first group one can perform a further grouping, for instance, grouping codes within a range 0–7 and 8–15 in a first subgroup and a second subgroup. A similar grouping is performed in said second grouping. Then execution of said application groupswise can exploit two memories. In the example that would be a first memory at least being capable of storing 16 array elements and a second memory at least being capable of storing 8 array elements. The relation to the memories should be considered per group size. With group size is meant here the maximal index difference between indexes of elements of said arrays being accessed by the codes within a group. One can state that codes within one group (group related to range 0–15 or the group related to range 16–31) exploit the same memory (the memory with minimal size 16). The same can be stated for subgroups. This approach of having groups with different group sizes and related memories with different minimal memory sizes but smaller than the main memory or at least not capable of storing the arrays completely can be used for more than two group and memory sizes of course.

Characteristic for the in-place scheduled code chunks is that codes accessing nearby elements in said array variables are scheduled nearby in time. With nearby elements is meant having a small difference between their index.

Figure 6:
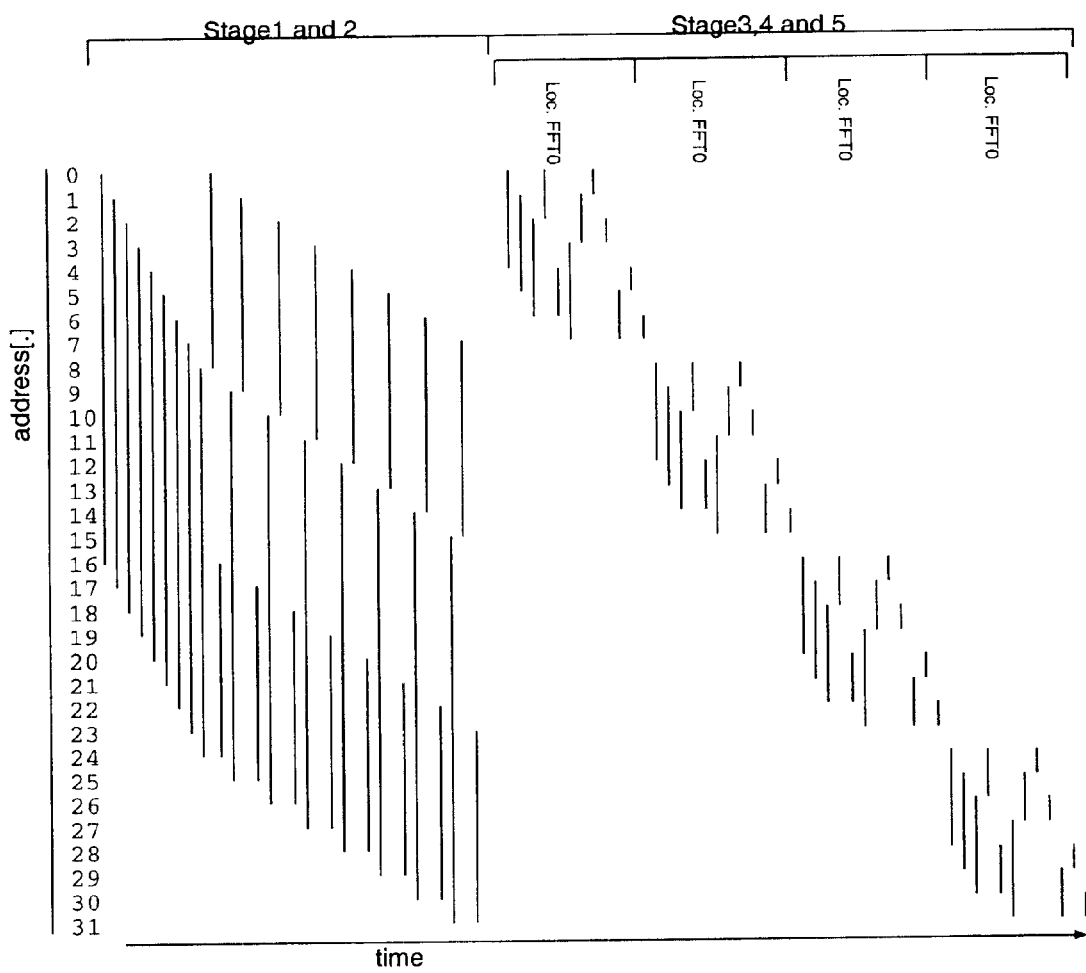
FIG. 6 shows a combination of a data locality and in-place mapped schedule.
Figure 7:
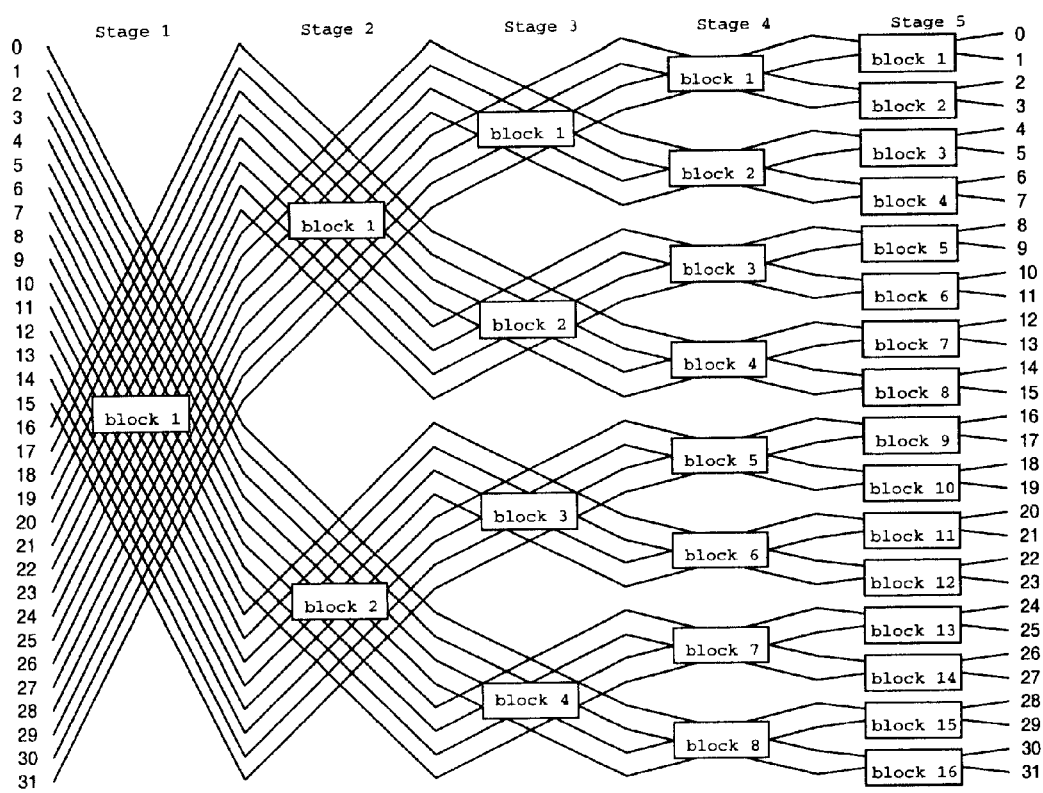
FIG. 7 shows a representation of an example of a fast transform, more in particular a fast Fourier transform, in which a stage by stage, block by block, butterfly by butterfly scheduling is shown.
Figure 8:
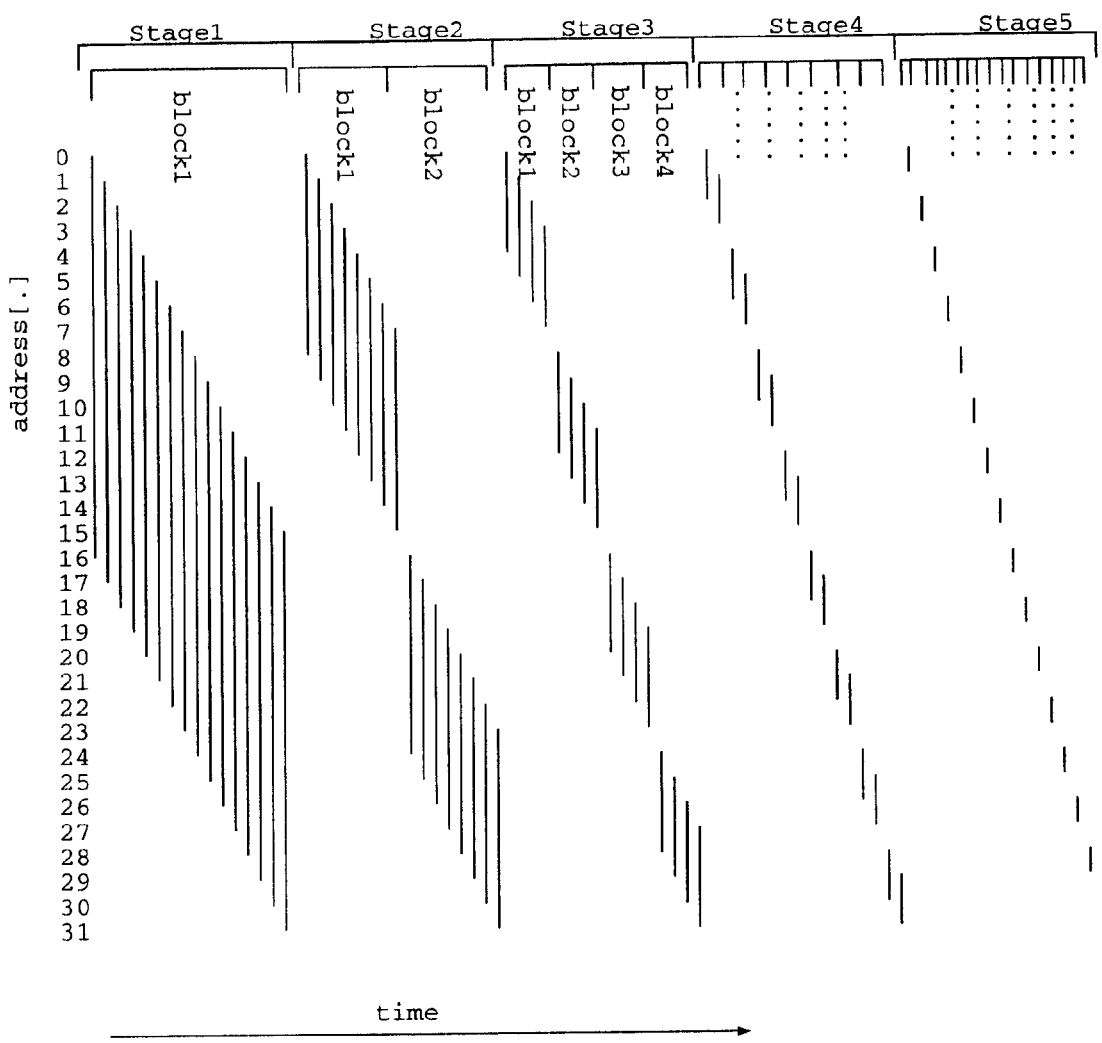
FIG. 8 shows the access graph of a traditional scheduling of the calculation methods in such a fast transform. Said access graph is not optimal with respect to power consumption and bus loading.

The first embodiment can be denoted as a schedule exploiting a partial in-place mapping while the second embodiment suggests performing a more extensive in-place mapping over several levels. Naturally the benefits of in-place mapping versus the drawbacks such as more memories must be considered in deciding how many levels one wants to consider. Also the hardware limitations of the device one wants to use must be taken into account when no custom design of said hardware device is possible. It must be emphasized that in-place mapping (complete or partial) is combinable with data locality improvement approaches. (complete or partial). FIG. 6 shows a mixed data locality and in-place approach.

The applications dealt with by the invention have as characteristic that the calculation method steps or butterfly codes can be labeled according to the maximal index difference between the indexes of the elements of the arrays they access. It is a further characteristic that the data dependencies of said fast transform application require that most of the butterfly codes with a high index difference must be executed in the beginning of the schedule while most of the butterfly codes with a lower index difference are scheduled at the end of the schedule. While in the prior art the data dependencies are respected because schedules are used which execute all butterfly codes with a high index difference before codes with a lower index difference are executed, it is the contribution of the invention that the scheduling freedom, which still remain even when data dependencies exist, is exploited. It is an aspect of the invention that this scheduling freedom is not only exploited for the last codes that must be executed but for a substantially part of the codes defining the application. As such a spreading of codes with a variatie of index differences over the time schedule for executing said application is performed. Note that although in the description a preference for going from high index differences to low index differences, a complete reversal, thus going from low to high is also possible and the invention is equally applicable to such applications. Then in the data locality improvement aspect of the invention the term maximal should be minimal and not-maximal should be not-minimal. The ordering in said binary trees is then from lower to higher index differences. More in general one could state that said butterfly codes are characterized by an index difference being with a range between a minimal index difference and a maximal index difference. These minimal index difference and maximal index difference define range boundaries. The applications are characterized in that one traverses mainly through said codes from one of said boundary to another of said boundary. One can thus define one of said boundaries to be the starting index boundary and the remaining boundary the finishing index boundary. Alternatively one can described said data locality improvement method as follows:

A method for transforming a first m-dimensional indexed array into a second m-dimensional indexed array, said method comprising the steps of executing a plurality of butterfly codes, each butterfly code being characterized by the elements of the indexed array accessed by said butterfly code, said execution is characterized in that at least part of said butterfly codes are assigned to at least one group and butterfly codes within a group are scheduled sequentially, said assignment of butterfly codes to a group comprises of a first selection step wherein from the set of butterfly codes with a index difference between the elements of the array accessed by said butterfly codes being equal to the starting index boundary a plurality of butterfly codes are selected and a second selection step wherein from the set of butterfly codes with a non-boundary index difference between the elements of the array accessed by said butterfly codes a plurality of butterfly codes which access at least one element of an array also being accessed by one of said plurality of butterfly codes selected by said first selection step are selected and assigning said butterfly codes determined by said first selection step and said second selection step to one group.

The invention has been described in terms of the index of the elements accessed and the index differences. It must be understood that embodiments which are equivalent with the described embodiments up to a structured address transformation are also providing the same power, data transfer and storage optimization and consequently also implicitly disclosed here.

What is claimed is:

1. A method of minimizing memory space and power consumption in a signal processor when transforming a first m-dimensional indexed array into a second m-dimensional indexed array, the method comprising:
    assigning at least a portion of a plurality of butterfly codes to at least one of a plurality of groups, wherein each butterfly code is associated with the elements of the first indexed array accessed by the butterfly code, and wherein the assignment comprises:
        selecting a first subset of butterfly codes having a maximal index difference between the elements of the array accessed by the butterfly codes from the plurality of butterfly codes;
        selecting a second subset of butterfly codes from the set of butterfly codes having a non-maximal index difference between the elements of the array accessed by the butterfly codes, wherein the second subset of butterfly codes access at least one element of an array also being accessed by one butterfly code of the first subset of butterfly codes; and
        assigning the butterfly codes determined by the first subset and the second subset to one of the plurality of groups;
    sequentially scheduling the portion of butterfly codes within each group; and
    executing the scheduled butterfly codes.

2. The method of claim 1, wherein the second m-dimensional array is a Fourier transform of the first m-dimensional array.

3. The method of claim 1, wherein for at least one group, sequentially scheduling the portion of butterfly codes assigned to the group comprises a depth-first traversing of a binary tree, wherein butterfly codes having a higher index difference between the elements of the arrays accessed are placed closer to a top node of the binary tree.

4. The method of claim 1, wherein executing the scheduled butterfly codes comprises accessing elements of the butterfly codes from storage spaces capable of storing a single element.

5. The method of claim 1, wherein m is 1.

6. A method of minimizing memory space and power consumption in a signal processor when transforming a first m-dimensional indexed array of length N into a second m-dimensional indexed array of length N, the method comprising:
    assigning at least a portion of a plurality of butterfly codes to at least one of a plurality of groups, wherein each butterfly code is associated with the elements of the first indexed array accessed by the butterfly code, and wherein the assignment comprises:
        identifying a subset of butterfly codes accessing elements of the arrays with an index difference between the elements smaller than a group-specific threshold value being at most $N/p$, wherein p is an integer larger than 1; and
        assigning the subset of butterfly codes to one of a plurality of groups;
    sequentially scheduling the portion of butterfly codes within each one of the plurality of groups;
    accessing a group-specific memory having a minimal storage space that is determined by the group-specific threshold value for that group; and
    executing the plurality of butterfly codes.

7. The method of claim 6, wherein the second m-dimensional indexed array is a Fourier transform of the first m-dimensional indexed array.

8. The method of claim 6, wherein the integer p is 2.

9. The method of claim 6, wherein m is 1.

10. The method of claim 6, wherein for a portion of the plurality of groups, butterfly codes within a first group are executed sequentially before executing butterfly codes of a second group.

11. The method of claim 6, wherein for a portion of the groups, butterfly codes within a first group are executed in parallel with the execution of butterfly codes of a second group.

12. The method of claim 11, wherein, after finishing execution of one group of butterfly codes, data is transferred between the group-specific memory of the one group and a second group-specific memory for a group having a larger group-specific threshold value or a memory having a storage space for at least N elements.

13. A method of minimizing memory space and power consumption in a signal processor when transforming a first m-dimensional indexed array of length N into a second m-dimensional indexed array of length N, the method comprising:
    defining a first subset of butterfly codes having a maximal index difference between the elements of the array accessed by the butterfly codes from the plurality of butterfly codes;

defining a plurality of smaller subsets of butterfly codes from the set of butterfly codes having a non-maximal index difference between the elements of the array accessed by the butterfly codes, wherein butterfly codes of each of the smaller subsets of butterfly codes each access at least one element of an array also being accessed by one butterfly code of the first subset of butterfly codes;

storing the first subset of butterfly codes in a first group-specific memory in a sequential order according to element index value;

sequentially ordering the butterfly codes in each of the smaller subsets of butterfly codes;

executing butterfly codes of the first subset of butterfly codes according to the stored sequential order; and executing sequentially ordered butterfly codes of the smaller subsets of butterfly codes.

14. The method of claim 13 wherein the sequential ordering of the smaller subsets of butterfly codes is ordered according to index difference between the elements of the array and according to a lowest element index value.

* * * * *